Oct. 23, 1945.   O. F. FITCH   2,387,434
HAY HANDLING DEVICE
Filed Jan. 17, 1944   4 Sheets-Sheet 1

INVENTOR.
Oran F. Fitch
BY
Victor J. Evans & Co.
ATTORNEYS

Oct. 23, 1945.   O. F. FITCH   2,387,434
HAY HANDLING DEVICE
Filed Jan. 17, 1944   4 Sheets-Sheet 2

INVENTOR.
Oran F. Fitch
BY
Victor J. Evans & Co.
ATTORNEYS

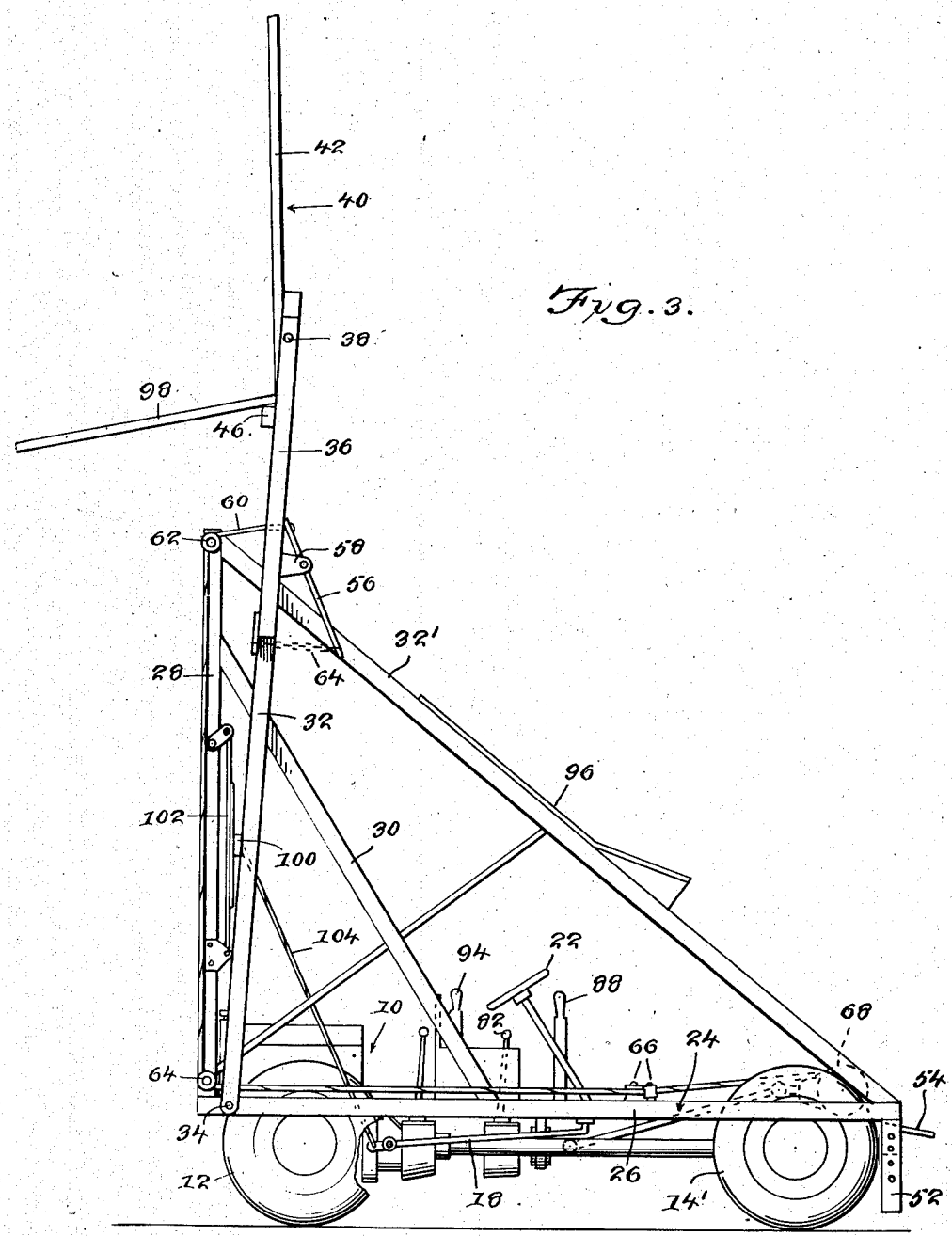

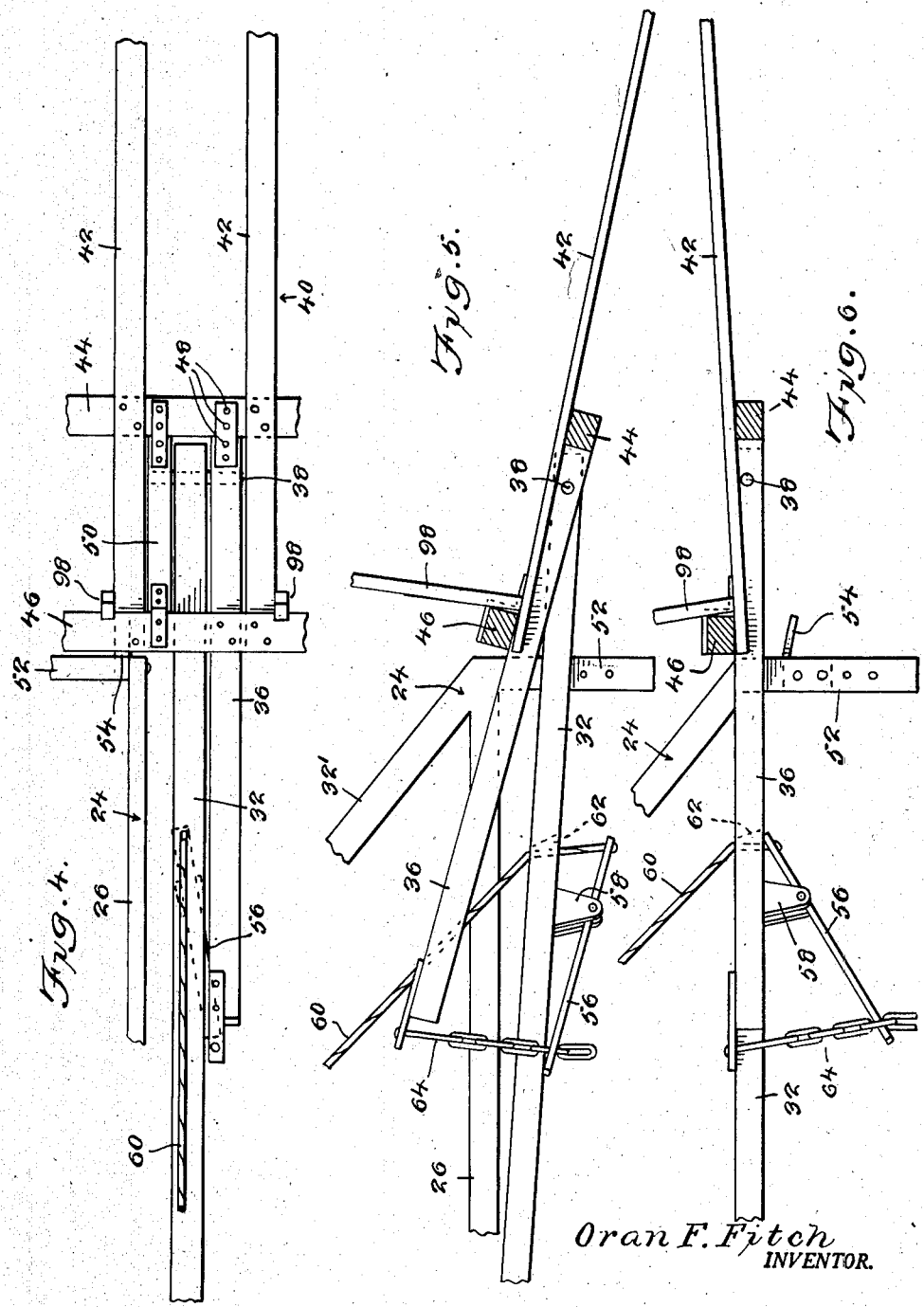

Patented Oct. 23, 1945

2,387,434

UNITED STATES PATENT OFFICE 2,387,434

HAY HANDLING DEVICE

Oran Ferrill Fitch, Auburn, Calif.

Application January 17, 1944, Serial No. 518,607

4 Claims. (Cl. 214—131)

My invention relates to the collection, loading and stacking of hay, and has among its objects and advantages the provision of an improved hay handling device performing the combined functions of a hay stacker, sweep rake and loader.

In the accompanying drawings:

Figure 3 is a side view illustrating the device adjusted to a hay dumping position in contradistinction to the hay collecting positions of Figures 1 and 2.

Figure 4 is a fragmentary top view of the sweep unit and its lifting means.

Figure 5 is a side view of the structure of Figure 4 illustrating the sweep unit in a raking position.

Figure 6 is a view illustrating the sweep unit in a tilted position clear of the ground, and Figure 7 is a sectional view taken along the line 7—7 of Figure 2.

Figure 1:
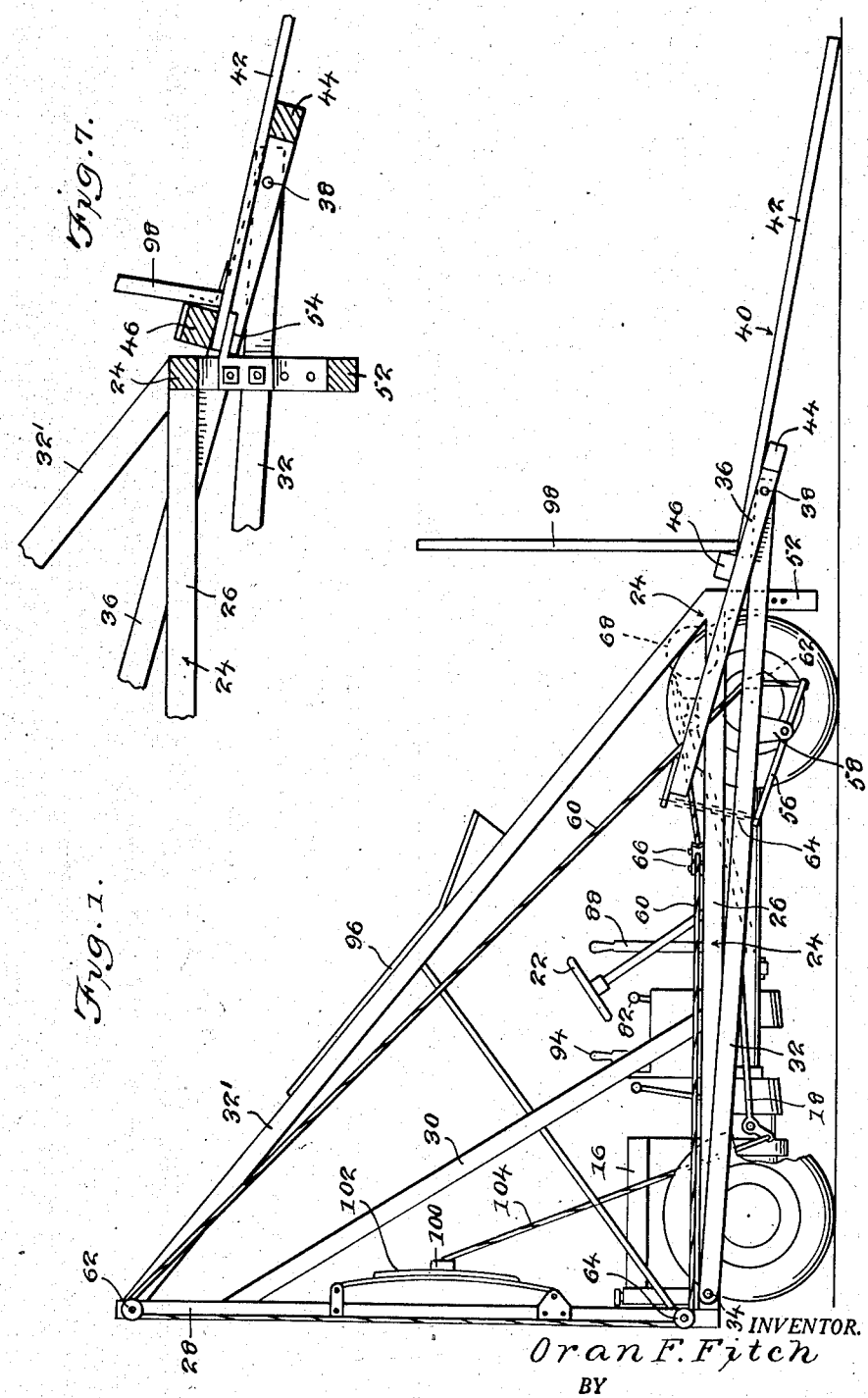
Figure 1 is a side view of my invention.
Figure 2:
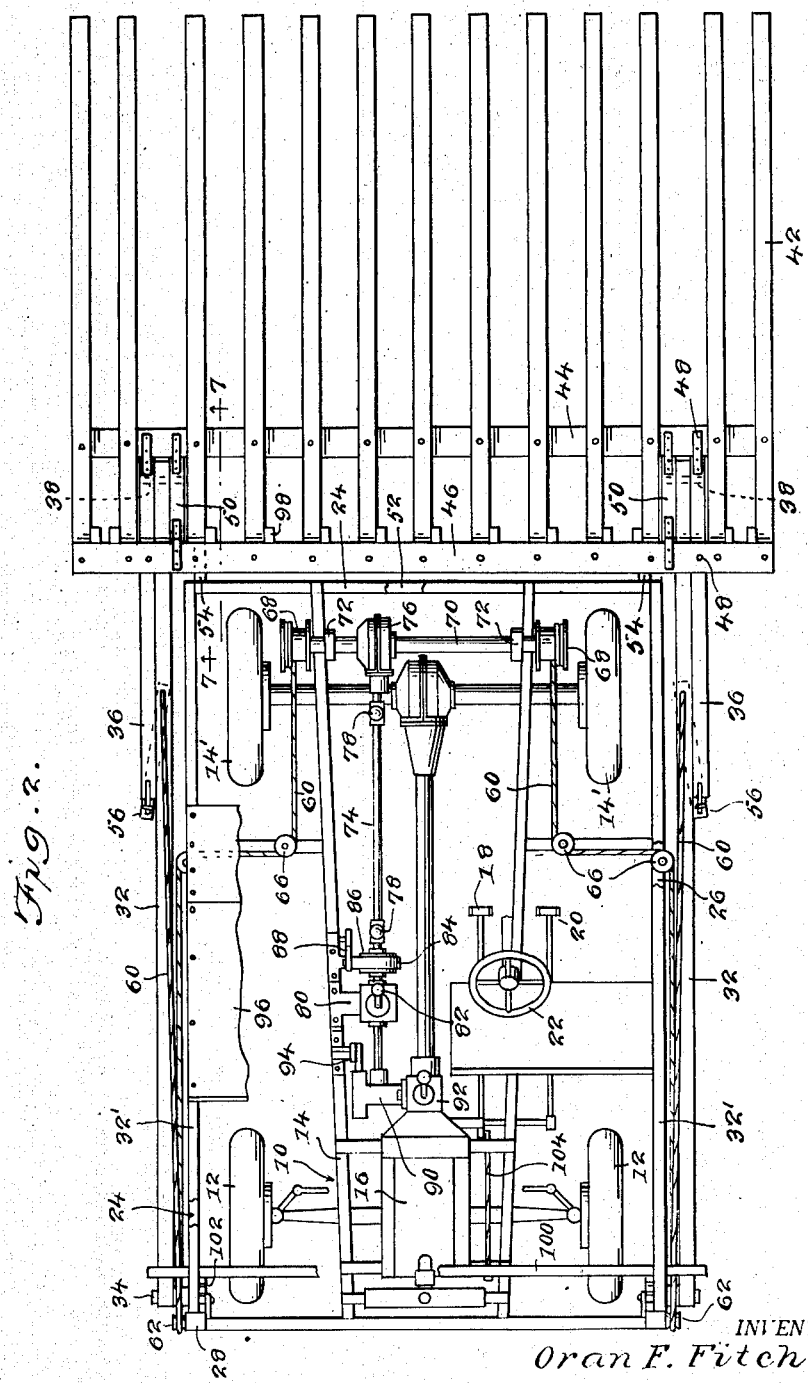
Figure 2 is a top plan view.

In the embodiment of the invention selected for illustration, I make use of a small truck 10 having the usual rear drive wheels 12 and front wheels 14'. The truck 10 includes a frame 14 and the usual engine 16. This engine also includes the usual clutch and brake devices, the clutch and brake pedals being respectively indicated at 18 and 20. However, the gears of the rear axle structure are preferably rearranged so that the vehicle travels rearwardly when the forward gears of the transmission are in operation. The steering wheel 22 is reversed so that the operator may face in the direction of the hay gathering movement of the device.

Upon the frame 14 is mounted a larger frame 24, which lies in a horizontal plane. This frame includes side frame members 26 which support upright frame members 28 braced by diagonal braces 30 and 32', the latter extending from the tops of the upright members 28 to the forward ends of the side members 26.

To the rear ends of the side members 26 are pivotally connected lifting members 32, as at 34. The members 32 lie adjacent the outer sides of the respective members 26 and extend forwardly of the vehicle to positions beyond the forward end of the frame 24. To the forward ends of the two members 26 are pivotally connected two beams 36. These beams lie adjacent the outer side faces of the respective members 32, and the pivotal connections 38 are located closely to the forward ends of the beams 36. The beams 36 carry the sweep unit 40.

The sweep unit 40 comprises tines 42 bolted to the top face of a cross beam 44 a short distance from their rear ends. The rear ends of the tines are bolted to the bottom face of a second cross beam 46, and the two cross beams are bolted at 48 to the beams 36. The beams 44 and 46 are additionally fixedly connected by braces 50 bolted to the respective cross beams. To the depending cross frame 52 at the forward end of the frame 24 are bolted two stops 54 which lie in the path of the cross beam 46 when the sweep unit 40 is lowered to the position of Figures 1 and 7.

Levers 56 are pivotally connected intermediate their ends with brackets 58 depending from the two members 32. To the forward end of each lever 56 is connected a pull line 60. Each line passes loosely through an opening 62 in its respective member 32. Chains 64 are connected with the rear ends of the levers 56 and with the rear ends of the beams 36. With the sweep unit 40 in the position of Figures 1 and 7, the pivots 38 are located forwardly of the stops 54 so that the weight of the members 32 load the sweep unit to hold the latter in effective engagement with the field. However, the sweep unit is free to pivot on the stops 54 to conform to field irregularities, the chains 64 providing desirable flexibility for this purpose. The sweep unit 40 may be pivoted upwardly a limited distance by exerting a pull on the lines 60, which brings the beams 36 into parallelism with the members 32, as in Figure 6, the levers 56 engaging the members 32 to prevent further pivotal movement of the sweep unit about the pivots 38.

The lines 60 pass upwardly around sheaves 62, downwardly of the upright members 28 and around sheaves 64, from which point the two lines pass around sheaves 66 mounted on the frame 24 and are attached to spools 68 on a shaft 70 mounted in bearings 72 on the frame 24. This shaft is driven through the medium of a drive shaft 74 having a geared connection (not shown) with the shaft 70, the geared connection being enclosed in a housing 76. Such drives are old and well known in the art and need not be described in detail.

Universal joints 78 are provided in the shafts 74 to accommodate the elevated position of the shaft 70. A transmission 80 is bolted to one of the frame members 14 and includes a control lever 82. A brake band 84 is provided for a brake drum 86 attached to the shaft 74, which band is controlled by a lever 88. A power take-off device 90 connects with the engine transmission 92, which take-off includes a control lever 94.

A shield 96 is attached to the diagonal braces 32 to protect the operator from material dropping from the sweep unit 40 as it is elevated.

In operation, the loaded sweep unit 40 is dumped by elevating the members 32 to the upright position of Figure 3. When in this position, the back structure 98 of the sweep unit 40 inclines in such degree as to permit the load to slide off the sweep unit. In some cases, the load or portions thereof might cling to the sweep unit. To facilitate removal under such conditions, the members 32 are caused to strike a cross beam 100 attached to springs 102 mounted on the upright members 28. Thus the members 32 may be repeatedly struck against the cross beam 100 to shake the load free from the sweep unit. As a matter of safety, a pull line 104 is attached to the cross beam 100 and passes downwardly for connection with the clutch lever 18, so that the clutch will be disengaged when the members 32 strike the cross beam.

My invention is designed to collect a relatively heavy load and to elevate the load to such an extent as to permit high stacking of the hay. The vehicle may be backed closely to the stack or point of unloading and the sweep unit 40 is elevated and located to a position which permits the hay to be discharged without interference from the vehicle frame structure.

Without further elaboration, the foregoing will so fully explain my invention, that others may, by applying current knowledge, readily adapt the same for use under various conditions of service.

I claim:

1. In a stacking machine of the type having a wheeled frame, a power element, and clutch and brake mechanism, a supplementary frame on the wheeled frame and having an upright back part, lift members pivoted on said supplementary frame, beams pivoted at one end to the pivoted lift members and extending forwardly thereof, a sweep unit attached to said beams at their ends, said sweep unit having a back structure extending normally upwardly from the sweep unit, rocking levers on the pivoted lift members attached to the other ends of the beams, cables attached to the rocking levers and connected with the winding drums connected with the power element, a spring mounted stop on the vertical frame to limit the upward movement of the pivoted lift members, a connection between said stop and the clutch to disconnect the power plant when the pivoted lift members engage the stop, and the rocking levers permitting limited motion of the sweep unit independent of the pivotal movement of the pivoted lift members.

2. In a stacking machine of the type having a wheeled frame, a power plant, a clutch and brake mechanism, a supplementary frame on the wheeled frame and having a vertical back part, lift members pivoted on said supplementary frame, a pair of beams pivoted at one end to the pivoted lift members and extending forwardly thereof, a sweep unit attached to said beams at their ends, said sweep unit having a back structure extending normally upwardly from the sweep unit, levers pivoted between their ends on the pivoted lift members and attached at their outer ends to the other ends of the beams, cables attached to the rocking levers and connected with winding drums connected with the power element, a back stop to limit the upward movement of the pivoted lift members, leaf springs supporting the back stop on the vertical back part, a connection between the clutch and the back stop to disconnect the power plant when the pivoted lift member engages the stop, and the rocking levers permitting limited movement of the sweep unit independent of the pivotal movement of the pivoted frame.

3. The invention as defined in claim 2 wherein the pivoted beams are normally inclined forwardly and downwardly to present the sweep unit toward and adjacent the ground, and movable to a position substantially aligned with the pivoted lift members to raise the sweep unit above the ground independent of the pivotal movement of the pivoted lift member, and said beams when aligned tilting the back structure of the sweep unit to a position inclined backwardly when the pivoted lift members are raised to contact the back stop, and a shield over the wheeled frame.

4. In a stacking machine, comprising a wheeled frame, a fixed frame on the wheeled frame, a pivoted vertically swingable lift member on the fixed frame, a pair of beams pivoted one on each side rail of the free end of the lift member, said beams normally tilted downwardly, a sweep having tines and attached to the beams and normally tilted to engage the ground, and means for pivoting the beams and the sweep to lie in a substantially horizontal position, and to vertically swing the lift member and the sweep, said means including levers pivoted betwen their ends and each having one end attached to a beam, and the other end to a pull line.

ORAN FERRILL FITCH.